United States Patent
Collette et al.

(10) Patent No.: US 11,794,452 B2
(45) Date of Patent: Oct. 24, 2023

(54) THERMOPLASTIC POLYMER FILM WITH INTERPENETRATING POLYMER NETWORK

(71) Applicant: Argotec, LLC, Greenfield, MA (US)

(72) Inventors: David Collette, South Hadley, MA (US); Ray Stewart, Redwood City, CA (US); Nathaniel Williams, Lynnfield, MA (US); James Galica, Westhampton, MA (US)

( * ) Notice: Subject to any disclaimer, the term of this patent is extended or adjusted under 35 U.S.C. 154(b) by 301 days.

(21) Appl. No.: 16/193,637

(22) Filed: Nov. 16, 2018

(65) Prior Publication Data

US 2019/0152200 A1 May 23, 2019

Related U.S. Application Data

(60) Provisional application No. 62/587,426, filed on Nov. 16, 2017.

(51) Int. Cl.
*B32B 27/08* (2006.01)
*B32B 27/18* (2006.01)
(Continued)

(52) U.S. Cl.
CPC ............ *B32B 27/08* (2013.01); *B29C 48/022* (2019.02); *B29C 48/21* (2019.02); *B29C 48/91* (2019.02);
(Continued)

(58) Field of Classification Search
CPC ......... B32B 27/08; B32B 27/18; B32B 27/36; B32B 27/365; B32B 27/40; B32B 33/00;
(Continued)

(56) References Cited

U.S. PATENT DOCUMENTS

| | | | |
|---|---|---|---|
| 4,353,961 A | | 10/1982 | Gotcher et al. |
| 5,342,666 A | * | 8/1994 | Ellison ................ B29C 45/1418 428/174 |

(Continued)

FOREIGN PATENT DOCUMENTS

| | | |
|---|---|---|
| CN | 101228030 A | 7/2008 |
| CN | 101522417 A | 9/2009 |

(Continued)

OTHER PUBLICATIONS

Chemblink, "Oligo[2-hydroxy-2-methyl-1-[4-(1-methylvinyl)phenyl]propanone] [163702-01-0]", Dec. 29, 2015 (Year: 2015).*

(Continued)

*Primary Examiner* — Callie E Shosho
*Assistant Examiner* — Steven A Rice
(74) *Attorney, Agent, or Firm* — Farber LLC

(57) ABSTRACT

A thermoplastic polymer film comprising a multilayer film having an interpenetrating polymer network (IPN) layer and a polymer layer is provided. The multilayer thermoplastic polymer film may possess beneficial and desirable properties useful in protecting surfaces from harmful environmental conditions or elements, such as for example, stain and scratch resistance as well as high gloss. Methods of making the multilayer film with interpenetrating polymer network are also provided.

22 Claims, 1 Drawing Sheet

(51) Int. Cl.

| | |
|---|---|
| *B32B 7/02* | (2019.01) |
| *C08G 18/42* | (2006.01) |
| *C08F 283/00* | (2006.01) |
| *B32B 27/36* | (2006.01) |
| *C08L 75/06* | (2006.01) |
| *B32B 33/00* | (2006.01) |
| *C08G 18/75* | (2006.01) |
| *B32B 27/16* | (2006.01) |
| *B32B 27/26* | (2006.01) |
| *C08L 33/02* | (2006.01) |
| *B29C 48/00* | (2019.01) |
| *B29C 48/21* | (2019.01) |
| *B29C 48/91* | (2019.01) |
| *B32B 27/40* | (2006.01) |
| *C08J 5/18* | (2006.01) |
| *B29K 75/00* | (2006.01) |
| *B29L 7/00* | (2006.01) |

(52) U.S. Cl.
CPC ............... *B32B 7/02* (2013.01); *B32B 27/16* (2013.01); *B32B 27/18* (2013.01); *B32B 27/26* (2013.01); *B32B 27/36* (2013.01); *B32B 27/365* (2013.01); *B32B 27/40* (2013.01); *B32B 33/00* (2013.01); *C08F 283/00* (2013.01); *C08F 283/006* (2013.01); *C08G 18/4277* (2013.01); *C08G 18/758* (2013.01); *C08J 5/18* (2013.01); *C08L 33/02* (2013.01); *C08L 75/06* (2013.01); *B29K 2075/00* (2013.01); *B29L 2007/008* (2013.01); *B32B 2250/02* (2013.01); *B32B 2250/03* (2013.01); *B32B 2250/24* (2013.01); *B32B 2250/244* (2013.01); *B32B 2307/406* (2013.01); *B32B 2307/584* (2013.01); *B32B 2307/712* (2013.01); *B32B 2307/714* (2013.01); *B32B 2405/00* (2013.01); *B32B 2457/20* (2013.01); *B32B 2571/00* (2013.01); *C08G 2270/00* (2013.01); *C08J 2375/06* (2013.01); *C08J 2435/02* (2013.01)

(58) Field of Classification Search
CPC ............ B32B 2250/02; B32B 2250/03; B32B 2250/24; B32B 2307/406; B32B 2307/584; B32B 2307/712; B32B 2307/714; C08G 18/4277; C08G 2270/00; C08L 75/06; B29K 2075/00
USPC ....................................... 428/423.1
See application file for complete search history.

(56) References Cited

U.S. PATENT DOCUMENTS

| | | | |
|---|---|---|---|
| 5,709,948 A | 1/1998 | Perez et al. | |
| 5,959,775 A * | 9/1999 | Joseph | ............... C08G 18/4277 359/538 |
| 5,965,256 A * | 10/1999 | Barrera | ................... B32B 27/08 428/354 |
| 8,096,508 B2 | 1/2012 | Marx et al. | |
| 8,168,260 B2 * | 5/2012 | Limerkens | ........... C08G 18/672 427/385.5 |
| 8,568,849 B2 | 10/2013 | Shi et al. | |
| 8,765,263 B2 | 7/2014 | Ho et al. | |
| 8,916,271 B2 | 12/2014 | Marx et al. | |
| 9,056,316 B2 | 6/2015 | Lawson et al. | |
| 9,074,111 B2 | 7/2015 | Ho | |
| 2010/0032090 A1 | 2/2010 | Myung et al. | |
| 2012/0045651 A1 | 2/2012 | Myung et al. | |
| 2012/0121845 A1 | 5/2012 | Groenewolt et al. | |
| 2014/0302308 A1 | 10/2014 | Ho | |
| 2014/0302328 A1 | 10/2014 | Cho et al. | |
| 2015/0099113 A1 | 4/2015 | Ho et al. | |

FOREIGN PATENT DOCUMENTS

| | | | |
|---|---|---|---|
| CN | 101939395 A | 1/2011 | |
| EP | 1695820 A1 | 8/2006 | |
| EP | 1 831 728 B1 | 7/2009 | |
| WO | 199919414 A1 | 4/1999 | |
| WO | 2006073785 A1 | 11/2006 | |
| WO | 2006118883 A2 | 11/2006 | |
| WO | 2008042883 A2 | 4/2008 | |
| WO | 2009100341 A1 | 8/2009 | |
| WO | 2010005992 A1 | 1/2010 | |
| WO | WO-2010005992 A1 * | 1/2010 | ............... A61F 2/02 |

OTHER PUBLICATIONS

IGM Resins, "Esacure Kip 100F Photoinitiator", Aug. 16, 2017 (Year: 2017).*
IGM Resins, "Esacure ONE Photoinitiator", Oct. 12, 2017 (Year: 2017).*
Swiderski, Kenneth W.; et al., "Urethane Acrylate Oligomers and UV/EB Curing: A Disruptive Technology for Traditional Urethane Prepolymers", Nov. 6, 2016 (Year: 2016).*
International Search Report and Written Opinion for corresponding PCT Appl. No. PCT/EP2018/081651 dated Feb. 21, 2019.
China National Intellectual Property Administration ("CNIPA"); Office Action dated Dec. 16, 2021; PRC (China) Patent Application No. 201880074620.6.
European Patent Office; Communication Pursuant to Article 94(3) EPC ("Office Action") dated Jun. 27, 2022; EP Patent Application No. 18 804 319.4-1107.

* cited by examiner

THERMOPLASTIC POLYMER FILM WITH INTERPENETRATING POLYMER NETWORK

CROSS-REFERENCE TO RELATED APPLICATIONS

This application claims benefit of U.S. Provisional Application No. 62/587,426, filed Nov. 16, 2017, the entire contents of which are incorporated herein by reference.

TECHNICAL FIELD

The present disclosure relates to multilayer protective polymer films, and more particularly, to multilayer polymer films for the protection of surfaces exposed to adverse environmental conditions or elements, including weather, solvents, debris, and/or dirt. Even more particularly, the disclosure relates to multilayer polymer films comprising an interpenetrating polymer network layer, and a method of making the films.

BACKGROUND

Protective polymer films, such as polyurethane films, are used to provide a strong and durable shield for any bare or painted metal, glass or plastic surface that may be exposed to extreme environmental conditions or elements, such as heat, sun, moisture, wind, debris, dirt, or those due to inclement weather, such as for example, rain, hail, snow, or sleet, as well as harsh or corrosive chemicals such as solvents or the like. These protective polyurethane films are useful for preventing damage from abrasion, chipping, deterioration or discoloration, and wear of the surfaces under those circumstances. Such films may be used to protect, for example, cars, trucks, appliances, mobile devices, computers, electronic display screens, and more. These protective polyurethane films may be either thermoset or thermoplastic.

Thermoset polyurethanes typically exhibit better abrasion resistance, heat resistance, and hardness compared to thermoplastic polyurethanes. Because thermoset polyurethanes generally comprise a network of cross-linked polymer chains, thermoset polyurethanes are typically formed using expensive casting processes. In contrast, thermoplastic polyurethanes are able to flow at elevated temperatures. The flowability of thermoplastic polyurethanes allows their production by less expensive techniques, such as for example, injection molding or extrusion.

Interpenetrating polymer networks (IPNs) are combinations of two or more polymers which have been polymerized and/or crosslinked in the presence of each other. One approach for making cross-linked thermoplastic polyurethanes, described in U.S. Pat. No. 8,168,260, involves formation of chemical bonds upon crosslinking a polymer and a thermoplastic polyurethane (TPU) having terminal functional radically-polymerizable groups on both ends of the TPU. These interpenetrating polymer networks, or IPNs, can be seen as analogous to polymer alloys, a combination of different polymers which allows the composite to collectively have certain advantageous benefits derived from, and often specifically attributable to, the individual polymer forming the alloy. Examples of these attributes may include, for example, transparency or hardness.

The layers of a multilayer protective film may confer different properties and provide different advantages. For example, one layer may confer stain resistance, while another layer may confer chip resistance. It is therefore desirable to provide a multilayer, protective polymeric film comprising an IPN layer and a polymer layer that provides different advantages such as, for example, stain and scratch resistance as well as high gloss.

BRIEF SUMMARY

The present disclosure generally relates to a thermoplastic polymer film comprising a multilayer film having an interpenetrating polymer network (IPN) layer and a polymer layer that possesses beneficial properties useful in protecting surfaces from harmful environmental conditions or elements.

According to one embodiment, the multilayer protective film may comprise a first layer comprising an interpenetrating network, and a second layer comprising one or more layers of a thermoplastic polymer. The interpenetrating network may comprise a thermoplastic polymer selected from the group consisting of a polyurethane, polycarbonate, polycaprolactone, and a combination thereof and cross-linked components selected from the group consisting of acrylates, methacrylates, and allylic isocyanurates. The second layer may comprise a thermoplastic polymer selected from the group consisting of a polyurethane, polycarbonate, polycaprolactone, and a combination thereof.

In one exemplary embodiment, the thermoplastic polyurethane may be an aliphatic, polycaprolactone-based thermoplastic polyurethane.

In certain embodiments, the interpenetrating network layer may have a dried Sharpie® ink removal by isopropanol wipe affording a value of greater than about 90% light transmission. In some embodiments, the interpenetrating network layer may have a tar stain removal of between about 4.5 to about 22 Delta YI (change in yellowness index). In some embodiments, the interpenetrating network layer may have a scratch resistance of greater than about 85 gloss units. In some embodiments, the interpenetrating network layer may have a gloss of greater than about 90 gloss units.

The disclosure also provides a method for making a multilayer film comprising an interpenetrating network layer and a thermoplastic polymer layer by first combining a thermoplastic polymer with monomers to form an interpenetrating network precursor, sequentially extruding or coextruding the interpenetrating network precursor and a second thermoplastic polymer to form the multilayer film, and curing the interpenetrating network precursor to form an interpenetrating network. The first and second thermoplastic polymers are selected from the group consisting of a polyurethane, polycarbonate, polycaprolactone, and a combination thereof. The monomers are selected from the group consisting of acrylates, methacrylates, and allylic isocyanurates.

The recitation herein of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The accompanying drawings, which are incorporated in and constitute a part of this specification, illustrate several embodiments of the disclosure and together with the description, serve to explain the principles of the disclosure.

DETAILED DESCRIPTION

Figure 1:
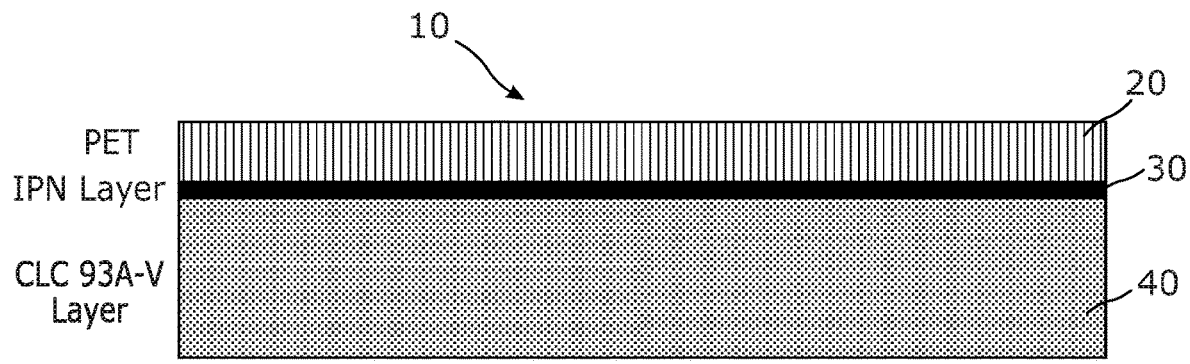
FIG. 1 is a cross-sectional view of an exemplary embodiment of a multilayer film of the present disclosure.

Except as otherwise noted, any quantitative values are approximate whether the word "about" or "approximately" or the like are stated or not. The materials, methods, and examples described herein are illustrative only and not intended to be limiting. Any molecular weight or molecular mass values are approximate and are provided only for description.

The present disclosure provides a thermoplastic polymer film comprising a multilayer film having an interpenetrating polymer network (IPN) layer and a polymer layer. The multilayer thermoplastic polymer film may possess beneficial and desirable properties useful in protecting surfaces from harmful environmental conditions or elements, such as for example, stain and scratch resistance as well as high gloss.

The thermoplastic polymer in the first and/or second layer can be a commercially available product. In some embodiments, the thermoplastic polymer can be a polyurethane, polycarbonate, polycaprolactone, or a combination thereof. Thermoplastic polyurethane polymers are typically formed by reacting polyols with polyisocyanates. The polyols can include polyester polyols, polyether polyols, polycarbonate polyols, and polycaprolactone polyols. In one embodiment, the polyol can be polycaprolactone-based. In another embodiment, the thermoplastic polyurethane can be an aliphatic, polycaprolactone-based thermoplastic polyurethane.

Polyisocyanates can include compounds having two or more isocyanate groups such as 4,4'-diisocyanatodicyclohexylmethane (H12MDI).

Prior to crosslinking (i.e., curing), the interpenetrating network precursor can comprise a thermoplastic polymer and monomers. After crosslinking, the interpenetrating network can comprise a thermoplastic polymer and crosslinked components, e.g. crosslinked monomers. The monomers and crosslinked components can include acrylates, methacrylates, and allylic isocyanurates. Typical monomers and crosslinked components may include triallyl isocyanurate (TAIC), trimethylolpropane triacrylate (TMPTA), di-trimethylolpropane tetraacrylate (DTMPTA), and tri-functional methacrylate (Saret SR 517R).

In certain embodiments, the interpenetrating network or its precursor can include one or more ultraviolet (UV) photoinitiators. Suitable UV photoinitiators can include but are not limited to: 1-hydroxy-cyclohexyl-phenyl ketone (e.g., Irgacure 184), a mixture of oxy-phenyl-acetic acid 2-[2 oxo-2 phenyl-acetoxy-ethoxy]-ethyl ester and oxy-phenyl-acetic 2-[2-hydroxy-ethoxy]-ethyl ester (e.g., Irgacure 754), phosphine oxide, phenylbis(2,4,6-trimethylbenzoyl) phosphine oxide (e.g., Irgacure 819), diphenyl (2,4,6-trimethylbenzoyl)-phosphine oxide (e.g., Darocure TPO or Genocure TPO), methylbenzoylformate (e.g., Omnirad MBF or Irgacure MBF), oligo[2-hydroxy-2-methyl-1-[4-(1-methylvinyl)phenyl]propanone] (e.g., KIP 150), 2,2-dimethoxy-1,2-diphenyl-ethanone (e.g., BDK), ethyl phenyl (2,4,6-trimethylbenzoyl) phosphinate, ethyl (2,4,6-trimethylbenzoyl)-phenyl-phosphinate (e.g., IGM Omnirad TPO-L), a mixture of 2 hydroxy-2-methylpropiophenone, ethyl (2,4,6-trimethylbenzoyl) (phenylphosphinate and oligo[2-hydroxy-2-methyl-1-[4-(1-methylvinyl)phenyl]propanone]) (e.g., IGM Omnirad BL-723), oligo(2-hydroxy-2-methyl-1-(4-(1-methylvinyl)phenyl)propanone) (e.g., IGM Esacure One), a blend of diphenyl(2,4,6-trimethylbenzoyl)-phosphine oxide and 2-hydroxy-2-methyl-1-phenyl-propanone) (e.g., IGM Omnirad 4265), a blend of piparazino based aminoalkylphenone and PPTTA, polyethylene glycol di(beta-4-[4-(2-dimethylamino-2-benzyl) butanoyl phenyl] piperazine)propionate (e.g., IGM Omnipol 910), (2,3-dihydro-6-(2-hydroxy-2-methyl-1-oxopropyl)-1,1,3-trimethyl-3-[4-(2-hydroxy-2-methyl-1-oxopropyl)phenyl]-1H-indene; 2,3-dihydro-5-(2-hydroxy-2-methyl-1-oxopropyl)-1,1,3-trimethyl-3-[4-(2-hydroxy-2-methyl-1-oxopropyl) phenyl]-1H-indene and 2-hydroxy-2-methylpropiophenone), 70% oligo[2-hydroxy-2-methyl-1-[4-(1-methylvinyl)phenyl]propanone] mixed with 30% 2-hydroxy-2-methylpropiophenone (e.g., IGM Esacure KIP 100F), diester of carboxymethoxy-benzophenone and polytetramethyleneglycol 250 (e.g., IGM Omnipol BP), and (1-propanone, 1,1'-(oxydi-4,1-phenylene)bis[2-hydroxy-2-methyl- and 1-hydroxycyclohexyl phenyl ketone) (e.g., PL Industries PL-704).

The interpenetrating network layer and/or the thermoplastic polymer layer can contain additives, heat stabilizers, UV absorbers (such as Tinuvin 234), etc. A typical heat stabilizer includes but is not limited to pentaerythritol tetrakis (3-(3, 5-di-tert-butyl-4-hydroxyphenyl) propionate) (e.g., Irganox 1010).

The multilayer polymeric film of the present disclosure may have a first, interpenetrating network layer bonded to a major surface of a second, thermoplastic polymer layer. The two layers may be bonded directly, for example, during coextrusion. Alternatively, one layer may be extruded onto a release liner and then laminated to the other layer. In certain embodiments, the first, interpenetrating network layer may be bonded to a major surface of the second, thermoplastic polymer layer and an adhesive may be bonded to an opposite major surface of the second layer such that the second layer is between the first layer and the adhesive layer. In one embodiment, the adhesive may be a pressure sensitive adhesive (PSA).

According to an aspect of the disclosure, the thickness of the IPN layer can be up to about 3 mil. In one embodiment, the thickness of the IPN film may be in the range of about 0.2 mil to about 3 mil. In another embodiment, the thickness of the IPN film may be in the range of about 0.5 mil to about 1.5 mil.

According to another aspect of the disclosure, the thickness of the second, thermoplastic polymer layer can be up to about 8 mil. In one embodiment, the thickness of the thermoplastic polyurethane base layer may be in the range of about 3 mil to about 8 mil. In another embodiment, the thickness of the thermoplastic polyurethane base layer may be in the range of about 4.5 mil to about 6.5 mil.

The thickness of the multilayer film can be in the range of about 5.5 mil to about 9.0 mil. In one embodiment, the thickness of the IPN surface layer may be about 0.5 mil, and the thickness of the thermoplastic polyurethane base layer(s) may be about 5.5 mil. In another embodiment, the thickness of the IPN surface layer may be about 1 mil, and the thickness of the thermoplastic polyurethane base layer(s) may be about 5 mil.

The first layer can comprise various percentages by weight of the first thermoplastic polymer and the crosslinked components. In certain embodiments, the first layer may comprise about 65% to about 75% by weight of the first thermoplastic polymer, and about 20% to about 30% by weight of the crosslinked components. In another embodiment, the first thermoplastic polymer is about 72% by weight, and the crosslinked components are about 28% by weight of the first layer.

In accordance with an aspect of the disclosure, the multilayer polymeric film may possess a high gloss, and scratch and stain resistant properties. Gloss can be measured at an angle of 60 degrees (°) and calibrated using a black glass standard of 100 gloss units (GU) ("GU, 60°" or "60° Gloss"). Stain resistance can be measured by methods known in the art, such as for example, by removal from the film of black permanent marker or tar after wiping with isopropyl alcohol or bug and tar remover, respectively. In certain embodiments, the first, IPN layer and/or the multilayer film may have a permanent or waterproof marker (e.g., Sharpie® marker) removal value of greater than about 90% light transmission or equal to or less than 2 (on a scale of 0-5, where 0=no retained marker stain). In certain embodiments, the first, IPN layer and/or the multilayer film has a tar stain removal of less than about 5.0 Delta YI (change in yellowness index) or equal to or less than 2 (on a scale of 0-5, where 0=no retained tar stain).

In certain embodiments, the first, IPN layer and/or the multilayer film may have a scratch resistance of greater than about 85 gloss units. In certain embodiments, the first, IPN layer and/or the multilayer film may have a gloss of greater than about 85 gloss units. Scratch resistance can be measured using methods known in the art, such as for example, a method in which (1) initial gloss can be measured as specular reflection of incident light at 60 degrees (angle between the incident light and the perpendicular), (2) scratched gloss can be measured at the time of or soon after scratching (e.g., abrading with sandpaper), and (3) recovery gloss can be measured at a given time after scratching, e.g., 24 hours after scratching.

According to an aspect of the disclosure, the multilayer polymeric film may be clear or transparent, and may be suitable for certain applications such as for paint protection. However, it is understood that in some embodiments, the multilayer polymeric film may be colored as desired. For example, the thermoplastic polyurethane or the reactive mixture may comprise pigment or other coloring agent. The multilayer polymeric film may be shaped and sized to conform to a surface to be protected before application to the surface. For example, the multilayer polymeric film may be used to protect various parts of a vehicle from ultraviolet light, weather, scratches from debris such as dirt, rocks, etc.

In accordance with another aspect of the present disclosure, methods of making the multilayer polymeric film disclosed herein and comprising an IPN layer and a thermoplastic polymer layer are provided. Generally, the methods comprise combining a first thermoplastic polymer with monomers to form an IPN precursor, bonding the IPN precursor to a second thermoplastic polymer, and curing the IPN precursor. Alternatively, the IPN precursor layer may be deposited onto a release liner, cured, and then laminated to the second thermoplastic layer.

Combining the first thermoplastic polyurethane with monomers can be done using conventional methods, such as for example, using a Banbury mixing machine, Farrel continuous mixer (FCM™), Brabender instrument, or by compounding using a twin screw extruder. Imbibition can occur, for example, by combining a thermoplastic polyurethane polymer in pellet form with a solution comprising monomers, wherein the thermoplastic polyurethane polymer pellets imbibe the components of the solution.

The layers of the multilayer polymeric film can be formed using conventional methods known in the art such as extrusion, calendaring, and solvent casting. For example, the multilayer film can be formed by co-extrusion of the first IPN layer and the second thermoplastic polymer layer using a multi-manifold coextrusion die or a coextrusion feedblock approach. The layers may also be extruded sequentially. The methods may also include laminating the multilayer film to an adhesive layer such that the second thermoplastic polymer layer is "sandwiched" between the IPN layer and the adhesive layer. Adhesives may include acrylics, polyurethanes, silicones, styrene-butadiene block copolymers, styrene-isoprene block copolymers, epoxies, cyanosacrylates, etc. In one embodiment, the adhesive may be a pressure sensitive adhesive (PSA).

The IPN precursor layer may be crosslinked or cured by any suitable means including e-beam, ultraviolet light, irradiation, or heat. Curing may occur before or after bonding the IPN precursor layer to the second thermoplastic polymer layer.

EXAMPLES

Example 1

Pellets of TPU 93A (aliphatic polycaprolactone based thermoplastic polyurethane, Lubrizol Corp., Wickliffe, Ohio) were dissolved in tetrahydrofuran at 70° C. to give a solution of 10% polymer. The solution was combined with varying amounts of TAIC (Sartomer Arkema) and a constant amount of photoinitiator Irgacure 184 (1-hydrocyclohexyl phenyl ketone) (BASF) and then cast onto a release liner.

After solvent evaporation at room temperature, then 60° C., and finally 100° C., transparent films of 50 to 100 μm thickness were obtained. The content of TAIC in the dried film varied from 15% to greater than 50%, while the content of Irgacure 184 was held at 4%. The films were irradiated with UV light in a chamber flushed with nitrogen from 3×15 seconds to 15 minutes (continuously).

For assessment of stain resistance, the films were marked with a Sharpie® pen and with road tar, heated at 80° C. for 1 hour, and washed with isopropanol until there was no reduction in stain intensity. A film of the TPU 93A without additives and UV exposure served as a control. For assessment of film flexibility, the films were bent through 180 degrees to observe failure by cracking. The gel content of the crosslinked films was determined. Stain resistance was measured by marking the film with a Sharpie® pen and with road tar. The film was heated at 80° C. for 1 hour, and then washed with isopropanol until there was no further reduction in stain intensity.

Stain intensity of an untreated polyurethane film was rated as "5" and no visible stain as "0". Films containing 25% or more of TAIC showed no retained stain (=0) for both Sharpie® and tar after 5 min. of UV exposure; their gel content was at least 93%. The control film showed a strong stain retention for both Sharpie® and tar (=5). Films that contained less than 50% TAIC were flexible (showed no cracks on folding through 180 degrees) after a UV exposure of 5 min. or more. Films that contained 25% of TAIC after a UV irradiation of 1 minute showed no retained Sharpie® stain and a trace of retained tar stain (=1); this film was folded several times through 180 degrees without cracking. Gloss was measured as specular reflection of incident light at 60 degrees. All UV crosslinked films were transparent, colorless and showed high gloss.

Example 2

A UV-curable formulation was prepared by imbibing TAIC and various additives into pellets of TPU 93A. The overall mixture had the following composition shown in Table 1. Silmer ACR Di-10 (Siltech Corp.) was included to prevent self-adherence of imbibed pellets.

TABLE 1

| Components | Weight (g) | Concentration (%) |
|---|---|---|
| TPU 93A pellets | 1134 | 70.8 |
| TAIC | 400 | 25.0 |
| Irgacure 184 | 64 | 4.0 |
| Irganox 1010 (antioxidant) (BASF) | 0.32 | 0.02 |
| Silmer ACR Di-10 (di-acrylate of an oligomeric dimethylsiloxane) | 3.20 | 0.2 |
| Total | 1602 | 100.0 |

To a KitchenAid® mixer, equipped with wire blades and a heating base, was added 1134 g of polymer pellets with the mixer chamber heated to approximately 40° C. The other components were combined to form a transparent liquid, which was added to the stirred pellets in small increments over time. The imbibing process was monitored by measuring the increase in weight of the imbibed pellets:

After 9 hours of imbibing, the mixture was agitated for an additional 3 hours to assure a uniform distribution of all components. The pellets were rubbery and free-flowing. One aliquot of the imbibed pellets was dissolved in tetrahydrofuran to give a 10% solids solution, which was cast onto a release liner, then dried to give a film of thickness approximately 50 µm. Another aliquot was compression molded at 140° C. between two sheets of release liners to give a film of thickness approximately 50 µm. Both films were irradiated with UV for 1 minute under nitrogen. The crosslinked films were transparent, colorless and flexible. They were stained with a Sharpie® pen and with road tar. There was no retained Sharpie® stain (=0) and a trace of retained tar stain (=1).

Example 3

Tri- and tetra-functional acrylate monomers in TPU 93A were evaluated. TMPTA (Sartomer Arkema), TAIC, and DTMPTA (Sartomer Arkema) were solvent and melt blended with TPU 93A and evaluated for rate of crosslinking by UV, and for stain resistance.

All monomers were molecularly compatible with TPU 93A, gave transparent films, and were thermally stable at 150° C. for 1 hour in air. The monomers swelled TPU 93 pellets. The imbibed pellets were self-adherent. Addition of less than 0.1% of hydrophobic fumed silica made them free-flowing. TAIC also dissolved TPU 93A. All monomers, with the appropriate photoinitiator (Irgacure 184 or mixtures of Irgacure 184 and Genocure TPO (Rahn)), crosslinked TPU 93A upon UV exposure in nitrogen to give stain (Sharpie®/tar) resistant films after UV exposure of sufficient length.

Solvent or melt compounding of TMPTA and TAIC at up to 35% with TPU 93A, after UV crosslinking in nitrogen, afforded colorless films that were flexible and stain resistant towards Sharpie® pen mark and tar. Films crosslinked with TAIC were colorless with photoinitiators Irgacure 184/Genocure TPO, while those with TMPTA and DTMPTA and the same photoinitiators, and identically crosslinked with UV, had a slightly yellow tinge that faded with time and exposure to light.

Melt blending and compression molding of TPU 93A formulation with 25 to 35% monomers and photoinitiators can be done at between 130° C. and 150° C. as suggested by evaluations with a Brabender mixing device at approximately 50 rpm using a sigma blade for about 15 min to obtain a uniform mixture.

The gloss of films of the aliphatic polyurethane TPU 93A was related to its refractive index ($n_D$=1.4878). A higher refractive index affords higher gloss. The refractive index of all the monomers was close to that of the TPU 93A, and the monomer incorporation into the polymer followed by crosslinking gave the same gloss as that observed for virgin TPU 93A film.

Example 4

The effect of length of time of UV irradiation on blends of TPU 93A and TMPTA or TAIC was evaluated. Blends containing TPU 93A (71%) 25% TMPTA or 35% TMPTA or 35% TAIC and 3% Irgacure 184 and 1% GenocureTPO were solvent cast from tetrahydrofuran solution with additives onto a release liner to give a coating of thickness 130 µm after drying at 100° C. The films were transparent and colorless. The films were cut into several pieces, which were then illuminated with UV in nitrogen for 15, 30, 60, 120 (and 240) seconds (sec), followed by marking with a Sharpie® pen and tar. On increasing the illumination time, the films became stiffer. The films were extracted with tetrahydrofuran to determine the gel content. Results are shown in Table 2.

TABLE 2

| UV exposure (sec) | Sharpie® Stain Rating 25% TAIC in TPU 93A | Tar Stain Rating 25% TAIC in TPU 93A | Sharpie® Stain Rating 35% TAIC in TPU 93A | Tar Stain Rating 35% TAIC in TPU 93A | Sharpie® Stain Rating 35% TMPTA in TPU 93A | Tar Stain Rating 35% TMPTA in TPU 93A |
|---|---|---|---|---|---|---|
| 15 | 0 | 5 | 1 | 4 | 1 | 2 |
| 30 | 0 | 4 | 0 | 3 | 0 | 1 |
| 60 | 0 | 2 | 0 | 3 | 0 | 1 |
| 120 | 0 | 1 | 0 | 1 | 0 | 1 |
| 240 | 0 | 0 | Not done | Not done | Not done | Not done |

A test with films containing the 35% TMPTA or 35% TAIC compositions prepared by compression molding at 140° C. gave nearly identical results for stain resistance.

Example 5

Imbibing of TMPTA into TPU 93A was performed. Fifteen grams of TPU 93A, 8.608 g TMPTA, 0.737 g Irgacure 184 and 0.245 g Genorad TPO were placed in a screw-cap tube together with about 8 g of heptane. The mixture was held at 70° C. for 2 days (or 110° C. for about 5 hours). The heptane was allowed to evaporate at room temperature, and traces of it were removed by heating at 100° C./1 h to give 24.5 g of slightly self-adhered pellets. The pellets had a melt index of 2.7 g/10 min at 140° C. and of 5.1 g/10 min at 150° C. (load: 3.8 kg; die: 2.09 mm). The pellets were compression molded to slabs at 140° C. to a thickness of 2-3 mils and showed the same stain resistance behavior as film of the same composition obtained by solvent casting. DTMPTA was imbibed into TPU 93A in the same manner. The time required to complete the imbibing was longer than that observed for TMPTA. The DTMPTA blend gave the same stain resistance and flexibility as the TMPTA blend.

The melt index test was repeated for a blend of 25% of TMPTA and 3% Irgacure 184 and 1% Genocure TPO in TPU 93A from 120° C. to 160° C. The data suggests that such blends are extrudable at 150 to 160° C.

Example 6

Formulation LR00736-04, comprising 72% CLC 93A-V pellets (aliphatic polycaprolactone TPU; Lubrizol Corp.) imbibed with 24% TAIC and 4% 2,2-dimethoxy-1,2-diphenyl-ethanone (IGM) was compared to commercially available protective films (XPEL Ultimate (XPEL Tech. Corp.; San Antonio, Tex.); SunTek (Eastman Chem. Co.; Martinsville, Va.); PremiumShield Elite (PremiumShield, Holliston, Mass.), and ArgoGUARD 49510 (Argotec, Greenfield, Mass.)) for Sharpie® and tar stain removal, scratch resistance, and gloss.

Sharpie® stain removal was evaluated by applying a coating of black marker to the film, allowing the marker to set for 2 minutes, followed by a vigorous 70% isopropyl alcohol (IPA) wiping using an IPA soaked cotton cloth until no more ink was removable. Sharpie® stain removal was measured as % light transmission (% LT) using a transparency/clarity meter.

Tar removal was evaluated by applying a blotch of tar to the film, baking the tar/film specimen for 60 minutes at 80° C. Then, the tar was removed using GM Bug and Tar Remover with a cotton cloth. Tar removal was measured as change in yellowness index (delta YI) using a spectrometer.

Gloss and scratch resistance were measured in gloss units at 60 degrees at time zero (initial gloss), scratch time, and 24 hours after scratch. Scratch was done by abrading using 200 grit sandpaper on a 200 gram sled for a fixed number of abrading wipes under a constant load. LR00736-04 demonstrated Sharpie® mark removal as good as the competitive topcoats (XPEL Ultimate, SunTek, and PremiumShield Elite) and much better than ArgoGUARD 49510. LR00736-04 demonstrated tar stain removal better than the competitive topcoats (XPEL Ultimate, SunTek, and PremiumShield Elite) and much better than ArgoGUARD 49510. LR00736-04 demonstrated high gloss. Scratch recovery was minimal; however, the film did not scratch much. Results are shown in Table 3.

TABLE 3

|  | XPEL Ultimate | SunTek | Premium Shield Elite | LR00736-04 | ArgoGUARD 49510 |
|---|---|---|---|---|---|
| Maximum Sharpie ® Stain Removal (% LT) | 92.3 | 91.2 | 92.7 | 91.3 | 64.5 |
| Tar Stain Removal (delta YI) | 5.89 | 14.39 | 8.59 | 4.45 | 30.4 |
| Scratch Resistance (Gloss Units) | | | | | |
| Initial Gloss | 90.9 | 93.9 | 88.6 | 88.0 | 87.9 |
| Scratched Gloss | 73.1 | 73.1 | 76.2 | 86.5 | 86.8 |
| 24 hr Gloss | 77.2 | 90.1 | 82.4 | 87.1 | 87.6 |

Example 7

72% CLC 93A-V pellets (aliphatic polycaprolactone TPU; Lubrizol Corp.) were imbibed with 24% TAIC and 4% 2,2-dimethoxy-1,2-diphenyl-ethanone (BDK) or 4% Irgacure 184 to form an interpenetrating network precursor blend. The IPN precursor blend was coextruded at about 150° C. to about 160° C. or laminated to ArgoGUARD 49510. The coextruded or laminated film was cured with UV light with PET used as an oxygen barrier to form a multilayer polymeric film comprising an interpenetrating polymer network (IPN) within a thermoplastic polyurethane (TPU) film. The IPN layer had a thickness of about 0.5 mil. The TPU layer had a thickness of about 5.5 mil. The multilayer film had a Sharpie® stain removal value of greater than about 90% light transmission, a tar stain removal of less than about 5.0 Delta YI, a scratch resistance of greater than about 85 gloss units, and a gloss of greater than about 90 gloss units.

Example 8

82.3% SR355 (DTMPTA (Sartomer Arkema)), 14.3% BDK and 3.4% heat stabilizer were pre-mixed and incorporated at a 30% loading into 70% CLC 93A-V pellets using a twin screw extruder equipped with liquid injection and underwater pelletizing capabilities. The IPN layer was extruded using these pellets at a loading of 100% in a layer about 0.6 mils in thickness while a TPU layer comprised of just CLC 93A-V was coextruded simultaneously with an individual thickness of about 5.5 mils. No interlayer instability was present at the interface of the two layers. The complete construction was laminated to PET with the IPN layer at the interface. The film was UV cured through the PET at 20 feet per minute, six times, using mercury microwave lamps within 12 hours of extrusion. The film was coated with pressure sensitive adhesive at a later date.

FIG. 1 illustrates a cross-sectional view of the film 10 produced in Example 8. In the embodiment shown, the PET layer 20 may have a thickness of approximately 2.0 mil. The IPN layer 30 may have a thickness of approximately 0.6 mil.

The CLC 93A-V layer 40 may have a thickness of approximately 5.5 mil. The test results of this material, identified as LR01267-1, are shown in Table 4 below.

TABLE 4

|  | LR01267-1 | KDX | SunTek | ArgoGUARD 49510-60D-V |
|---|---|---|---|---|
| Maximum Sharpie ® Stain Removal (% LT) | 87.9 | 89.1 | 83.2 | 62.2 |
| Tar Stain Removal (delta YI) | 21.15 | 17.88 | 14.00 | 21.27 |
| Scratch Resistance (Gloss Units) | | | | |
| Initial Gloss | 93.7 | 88.5 | 94.7 | 93.6 |
| Scratched Gloss | 81.8 | 87.6 | 88.9 | 77.6 |
| 24 hr Gloss | 87.6 | 87.2 | 91.5 | 87.3 |

Figure 2:
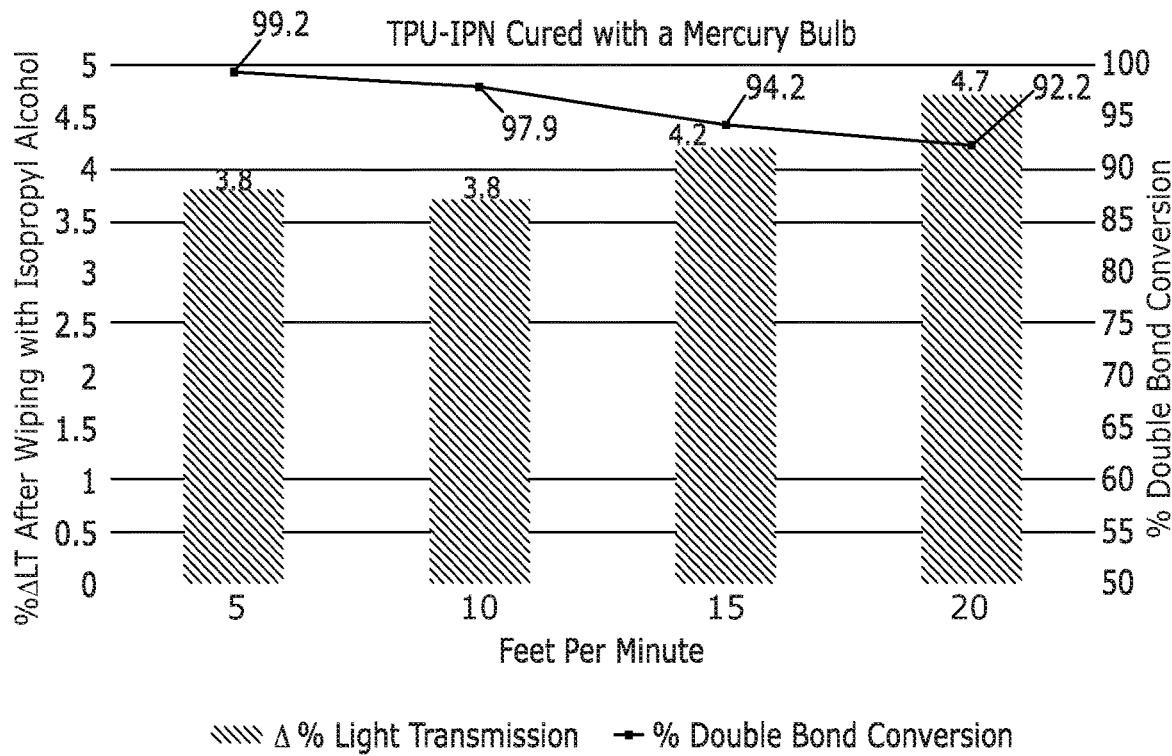
FIG. 2 is a graph representing carbon-carbon double bond conversion and Sharpie® stain removability versus curing speed of the multilayer film of FIG. 1.

As represented in the graph at FIG. 2, a faster web curing speed resulted in reduced carbon-carbon double bond conversion and reduced Sharpie® stain removability. Note that the A % LT is calculated by subtracting the final percent light transmission of the film after marker removal from the initial percent light transmission of the film prior to being marked. Therefore, the lower the number, the better the removal.

While the invention has been described in detail herein in accordance with certain preferred embodiments thereof, many modifications and changes therein may be effected by those skilled in the art. Accordingly, the foregoing disclosure should not be construed to be limited thereby but should be construed to include such aforementioned obvious variations and be limited only by the spirit and scope of the following claims.

What is claimed is:

1. A multilayer thermoplastic film comprising:
   a first layer having a thickness of about 0.2 mil to about 3 mil and comprising an interpenetrating network, wherein the interpenetrating network comprises:
      a first thermoplastic polymer, wherein the first thermoplastic polymer is a cured polymer selected from the group consisting of a polyurethane, polycarbonate, polycaprolactone, and a combination thereof,
      crosslinked components, wherein the crosslinked components are selected from the group consisting of acrylates, methacrylates, and allylic isocyanurates, and
      a photoinitiator, wherein the crosslinked components and the photoinitiator are combined with the cured polymer to form the interpenetrating network; and
   a second layer comprising one or more layers of a second thermoplastic polymer, wherein the second thermoplastic polymer is selected from the group consisting of a polyurethane, polycarbonate, polycaprolactone, and a combination thereof.

2. The multilayer thermoplastic film of claim 1, wherein the crosslinked components are selected from the group consisting of triallyl isocyanurate (TAIC), trimethylolpropane triacrylate (TMPTA), di-trimethylolpropane tetraacrylate (DTMPTA), and tri-functional methacrylate.

3. The multilayer thermoplastic film of claim 1, wherein the photoinitiator is selected from the group consisting of 1-hydroxy-cyclohexyl-phenyl ketone, a mixture of oxyphenyl-acetic acid 2-[2 oxo-2-acetoxy-ethoxy]-ethyl ester and oxy-phenyl-acetic 2-[2-hydroxy-ethoxy]-ethyl ester, phosphine oxide, phenylbis(2,4,6-trimethylbenzoyl) phosphine oxide, diphenyl (2,4,6-trimethylbenzoyl)-phosphine oxide (TPO), methylbenzoylformate (MBF), oligo[2-hydroxy-2-methyl-1-[4-(1-methylvinyl)phenyl]propanone], 2,2-dimethoxy-1,2-diphenyl-ethanone (BDK), ethyl phenyl (2,4,6-trimethylbenzoyl) phosphinate, ethyl (2,4,6-trimethylbenzoyl)-phenyl-phosphinate, a mixture of 2 hydroxy-2-methylpropiophenone, ethyl (2,4,6-trimethylbenzoyl) (phenylphosphinate and oligo[2-hydroxy-2-methyl-1-[4-(1-methylvinyl)phenyl]propanone]), difunctional alpha-hydroxy ketone, oligo(2-hydroxy-2-methyl-1-(4-(1-methylvinyl)phenyl)propanone), a blend of diphenyl(2,4,6-trimethylbenzoyl)-phosphine oxide and 2-hydroxy-2-methyl-1-phenyl-propanone, a blend of piparazino based aminoalkylphenone and pentaerythritol tetraacrylate (PPTTA), polyethylene glycol di(beta-4-[4-(2-dimethylamino-2-benzyl) butanoyl phenyl]piperazine)propionate, 2,3-dihydro-6-(2-hydroxy-2-methyl-1-oxopropyl)-1,1,3-trimethyl-3-[4-(2-hydroxy-2-methyl-1-oxopropyl)phenyl]-1H-indene; a mixture of 2,3-dihydro-5-(2-hydroxy-2-methyl-1-oxopropyl)-1,1,3-trimethyl-3-[4-(2-hydroxy-2-methyl-1-oxopropyl)phenyl]-1H-indene and 2-hydroxy-2-methylpropiophenone, 70% oligo[2-hydroxy-2-methyl-1-[4-(1-methylvinyl)phenyl]propanone] mixed with 30% 2-hydroxy-2-methylpropiophenone, diester of carboxymethoxy-benzophenone and polytetramethyleneglycol 250, and a mixture of 1-propanone, 1,1'-oxydi-4,1-phenylene)-bis(2-hydroxy-2-methyl- and 1-hydroxycyclohexyl phenyl ketone).

4. The multilayer thermoplastic film of claim 1, further comprising a heat stabilizer.

5. The multilayer thermoplastic film of claim 1, wherein the second layer has a thickness of about 3 mil to about 8 mil.

6. The multilayer thermoplastic film of claim 1, wherein the first layer comprises about 65% to about 75% by weight of the first thermoplastic polymer and about 20% to about 30% by weight of the crosslinked components.

7. The multilayer thermoplastic film of claim 1, wherein the first thermoplastic polymer is about 72% by weight and the crosslinked components are about 24% by weight of the first layer.

8. The multilayer thermoplastic film of claim 1, wherein the first layer exhibits a permanent marker stain removal value of greater than about 90% light transmission.

9. The multilayer thermoplastic film of claim 1, wherein the first layer exhibits a tar stain removal of between about 4.5 to 22 Delta YI.

10. The multilayer thermoplastic film of claim 1, wherein the first layer exhibits a scratch resistance of greater than about 85 gloss units.

11. The multilayer thermoplastic film of claim 1, wherein the first layer has a gloss of greater than about 90 gloss units.

12. The multilayer thermoplastic film of claim 1, wherein the first layer is bonded to one major surface of the second layer.

13. The multilayer thermoplastic film of claim 12, further comprising a pressure sensitive adhesive (PSA) layer bonded to an opposite major surface of the second layer such that the second layer is positioned between the first layer and the PSA layer.

14. A method for making a multilayer thermoplastic film comprising:
   (a) combining a first thermoplastic polymer with crosslinked components and a photoinitiator to form a first layer comprising an interpenetrating network precursor, wherein the first thermoplastic polymer is a cured polymer selected from the group consisting of a polyurethane, polycarbonate, polycaprolactone, and a combination thereof, and wherein the crosslinked components are selected from the group consisting of acrylates, methacrylates, and allylic isocyanurates, (b) coextruding the interpenetrating network precursor with a second layer comprising a second thermoplastic polymer to form a multilayer thermoplastic film, wherein the second thermoplastic polymer is selected from the group consisting of a polyurethane, polycarbonate, polycaprolactone, and a combination thereof, and (c) curing the interpenetrating network precursor to form an interpenetrating network, wherein the multilayer thermoplastic film comprises an interpenetrating network layer and one or more layers of the second thermoplastic polymer, and wherein the interpenetrating network layer has a thickness of about 0.2 mil to about 3 mil.

15. A method for making a multilayer thermoplastic film comprising:

(a) combining a first thermoplastic polymer with crosslinked components and a photoinitiator to form an interpenetrating network precursor, wherein the first thermoplastic polymer is a cured polymer selected from the group consisting of a polyurethane, polycarbonate, polycaprolactone, and a combination thereof, and wherein the crosslinked components are selected from the group consisting of acrylates, methacrylates, and allylic isocyanurates, (b) extruding the interpenetrating network precursor to form a first layer;

(c) extruding a second thermoplastic polymer to form a second layer, wherein the second thermoplastic polymer is selected from the group consisting of a polyurethane, polycarbonate, polycaprolactone, and a combination thereof;

(d) depositing the interpenetrating network precursor onto the second thermoplastic polymer; and (e) curing the interpenetrating network precursor to form an interpenetrating network, and wherein the interpenetrating network layer has a thickness of about 0.2 mil to about 3 mil.

16. The method of claim 15, wherein the multilayer thermoplastic film has a permanent marker stain removal value of greater than about 90%, a tar stain removal of between about 4.5 to 22 Delta YI, a scratch resistance of greater than about 85 gloss units, and a gloss of greater than about 90 gloss units.

17. The method of claim 15, further comprising adding additives or stabilizers to the first thermoplastic polymer the crosslinked components, and the photoinitiator.

18. The method of claim 15, wherein the interpenetrating network precursor is cured by e-beam, ultraviolet light, irradiation, or heat.

19. The method of claim 15, wherein the crosslinked components are combined with the first thermoplastic polyurethane by mixing, compounding or imbibing.

20. A multilayer thermoplastic film comprising: a first layer comprising an interpenetrating network, wherein the interpenetrating network comprises:

a first thermoplastic polymer, wherein the first thermoplastic polymer is a cured polymer selected from the group consisting of a polyurethane, polycarbonate, polycaprolactone, and a combination thereof, crosslinked components, wherein the crosslinked components are selected from the group consisting of triallyl isocyanurate (TAIC), trimethylolpropane triacrylate (TMPTA), di-trimethylolpropane tetraacrylate (DTMPTA), and tri-functional methacrylate, and a photoinitiator, wherein the crosslinked components and the photoinitiator are combined with the cured polymer to form the interpenetrating network; and a second layer comprising one or more layers of a second thermoplastic polymer, wherein the second thermoplastic polymer is selected from the group consisting of a polyurethane, polycarbonate, polycaprolactone, and a combination thereof.

21. A multilayer thermoplastic film comprising:

a first layer comprising an interpenetrating network, wherein the interpenetrating network comprises:

a first thermoplastic polymer, wherein the first thermoplastic polymer is a cured polymer selected from the group consisting of a polyurethane, polycarbonate, polycaprolactone, and a combination thereof, crosslinked components, wherein the crosslinked components are selected from the group consisting of acrylates, methacrylates, and allylic isocyanurates, and a photoinitiator, wherein the photoinitiator is selected from the group consisting of 1-hydroxy-cyclohexyl-phenyl ketone, a mixture of oxy-phenyl-acetic acid 2-[2 oxo-2-acetoxy-ethoxy]-ethyl ester and oxy-phenyl-acetic 2-[2-hydroxy-ethoxy]-ethyl ester, phosphine oxide, phenylbis(2,4,6-trimethylbenzoyl) phosphine oxide, diphenyl (2,4,6-trimethylbenzoyl)-phosphine oxide (TPO), methylbenzoylformate (MBF), oligo[2-hydroxy-2-methyl-1-[4-(1-methylvinyl)phenyl]propanone], 2,2-dimethoxy-1,2-diphenyl-ethanone (BDK), ethyl phenyl (2,4,6-trimethylbenzoyl) phosphinate, ethyl (2,4,6-trimethylbenzoyl)-phenyl-phosphinate, a mixture of 2 hydroxy-2-methylpropiophenone, ethyl (2,4,6-trimethylbenzoyl) (phenylphosphinate and oligo[2-hydroxy-2-methyl-1-[4-(1-methylvinyl)phenyl]propanone]), difunctional alpha-hydroxy ketone, oligo (2-hydroxy-2-methyl-1-(4-(1-methylvinyl)phenyl) propanone), a blend of diphenyl(2,4,6-trimethylbenzoyl)-phosphine oxide and 2-hydroxy-2-methyl-1-phenyl-propanone, a blend of piparazino based aminoalkylphenone and pentaerythritol tetraacrylate (PPTTA), polyethylene glycol di(beta-4-[4-(2-dimethylamino-2-benzyl) butanoyl phenyl] piperazine)propionate, 2,3-dihydro-6-(2-hydroxy-2-methyl-1-oxopropyl)-1,1,3-trimethyl-3-[4-(2-hydroxy-2-methyl-1-oxopropyl)phenyl]-1H-indene; a mixture of 2,3-dihydro-5-(2-hydroxy-2-methyl-1-oxopropyl)-1,1,3-trimethyl-3-[4-(2-hydroxy-2-methyl-1-oxopropyl)phenyl]-1H-indene and 2-hydroxy-2-methylpropiophenone, 70% oligo[2-hydroxy-2-methyl-1-[4-(1-methylvinyl)phenyl] propanone] mixed with 30% 2-hydroxy-2-methylpropiophenone, diester of carboxymethoxybenzophenone and polytetramethyleneglycol 250, and a mixture of 1-propanone, 1,1'-(oxydi-4,1-phenylene)-bis(2-hydroxy-2-methyl and 1-hydroxycyclohexyl phenyl ketone) wherein the crosslinked components and the photoinitiator are combined with the cured polymer to form the interpenetrating network; and a second layer comprising one or more layers of a second thermoplastic polymer, wherein the second thermoplastic polymer is selected from the group consisting of a polyurethane, polycarbonate, polycaprolactone, and a combination thereof.

22. A multilayer thermoplastic film comprising:
a first layer comprising an interpenetrating network, wherein the interpenetrating network comprises:
a first thermoplastic polymer, wherein the first thermoplastic polymer is a cured polymer selected from the group consisting of a polyurethane, polycarbonate, polycaprolactone, and a combination thereof,
crosslinked components, wherein the crosslinked components are selected from the group consisting of acrylates, methacrylates, and allylic isocyanurates, and
a photoinitiator, wherein the crosslinked components and the photoinitiator are combined with the cured polymer to form the interpenetrating network, wherein the first layer comprises about 65% to about 75% by weight of the first thermoplastic polymer and about 20% to about 30% by weight of the crosslinked components; and
a second layer comprising one or more layers of a second thermoplastic polymer, wherein the second thermoplastic polymer is selected from the group consisting of a polyurethane, polycarbonate, polycaprolactone, and a combination thereof.

\* \* \* \* \*